May 18, 1926.
R. A. BOOKER
PEENING TOOL
Original Filed March 30, 1922
1,585,327
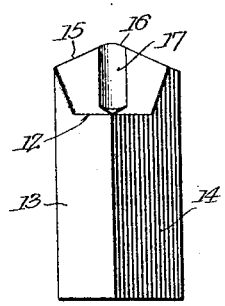
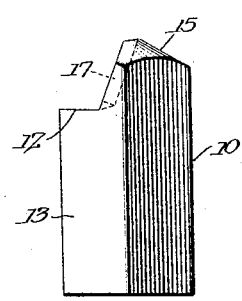
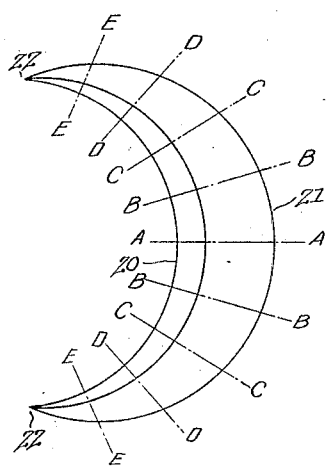
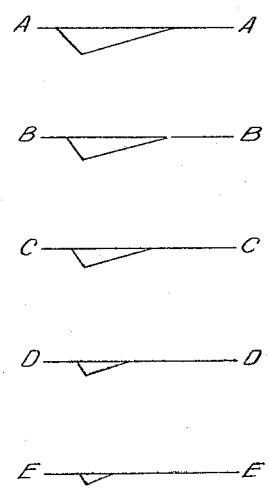
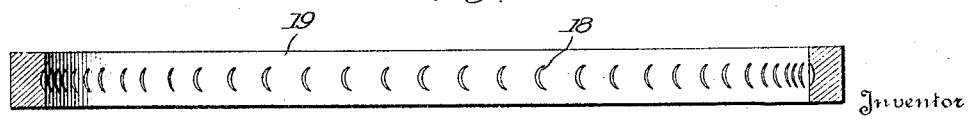
Inventor
Richard A. Booker.
By Cushman, Bryant & Darby
Attorneys Patented May 18, 1926.

1,585,327

UNITED STATES PATENT OFFICE.

RICHARD A. BOOKER, OF RICHMOND, INDIANA, ASSIGNOR TO RICHMOND PISTON RING CO., OF RICHMOND, INDIANA, A CORPORATION OF INDIANA.

PEENING TOOL.

Original application filed March 30, 1922, Serial No. 548,111. Divided and this application filed August 21, 1923. Serial No. 658,568.

This invention, which is a division of applicant's co-pending application Serial No. 548,111, filed March 30, 1922, has been made the subject of a separate application under official requirement, and relates to a peening tool for piston rings, which is so formed as to provide a peening point or face capable of producing a substantially lune-shaped indentation or impression on the interior surface of the piston ring, so that a uniform radial spring pressure is exerted on the ends of the ring when the latter is severed.

The invention essentially embodies a peening tool having a base formed by cutting away two of the adjacent sides of a blank for a limited distance from one end of the tool, and rounding its indenting or striking surface in the shape of a cone so as to have it slope uniformly in all directions from its apex. A longitudinal groove is arranged to extend inwardly from the apex of the cone so as to give a curved base to the conical peening surface and ensure the greatest depth being formed in the center of the lune; the depth of the indentation gradually diminishing from the center towards the apices of the interior and exterior arcs of the lune, at which point the impression will coincide or become flush with the inner wall of the ring.

In the drawings:—

Fig. 1 is a front elevation of the view of the peening tool.

Fig. 2 is a top plan view of the peening tool.

Fig. 3 is a side elevational view of the peening tool.

Fig. 4 is a diagrammatic view illustrating the lune shaped impression formed by the peening tool on the inner wall of the ring.

Fig. 5 is a series of cross-sectional views taken at the points indicated in Figure 4.

Fig. 6 is a horizontal sectional view showing the lune-shaped indentations formed in the interior wall of a piston ring.

Referring to the drawings, wherein like numerals indicate like parts in the several views, 10 denotes the shank of a peening tool preferably square in cross section so as to be removably secured to any suitable holder, not shown. Obviously the shank 10 may be of any other polygonal formation. One edge of the tool is preferably formed with a flat surface 11 adapted to be engaged by any suitable means extending transversely through the holder so as to prevent removal of the shank therefrom.

A base 12 is preferably formed by cutting away any two adjacent sides of the shank, such as 13 and 14, a limited distance from one end of the tool. The striking face 15 being shaped so as to form a true conical surface which slopes uniformly in all directions from its apex 16. A longitudinal groove 17 extends inwardly towards the base 12 from the apex so as to give a curved base to the conical peening surface from which a symmetrical lune-shaped indentation will be generated upon a blow of the peening tool.

It will be seen that by providing the groove 17 at the apex of the cone the lune-shaped indentation 18 formed on the interior surface of the piston ring 19 will have its greatest depth at the center of the lune as diagrammatically shown at A—A in Figs. 4 and 5, so as to gradually decrease in depth from the center of the interior arc 20 and the exterior arc 21 towards their apices 22, at which point the impression of the tool coincides or becomes flush with the inner wall of the piston ring 19, as shown in Figure 6.

By reason of the present construction a tool is provided in which the peening blow is so distributed along the inner surface of the piston ring that danger of breakage is eliminated since the greatest depth and width of the indentation is at the center of the ring and gradually decreases as it approaches the edges of the ring, thus distributing the impact of the peening blow to the indented area and eliminating any stresses which might tend to weaken the ring.

It is to be understood that the form of the invention herewith shown and described is merely illustrative of a preferred embodiment of the same, and in no sense restrictive, and that such minor changes and arrangement of parts as fall within the purview of one skilled in the art may be made without departing from the spirit of the invention and the scope of what is claimed.

What is claimed is:—

1. A peening tool having a conical striking face substantially triangular in base outline, and a longitudinal groove formed in the base of the triangle intermediate its width.

2. A peening tool having a conical striking face substantially triangular in base outline, a longitudinal groove formed in the base of the triangle intermediate its width, said striking face making a lune-shape impression when brought into contact with a surface.

3. A peening tool having a conical striking face substantially triangular in base outline, a groove in the base of the triangle, a surface of the striking face gradually and uniformly sloping from said groove to the sides.

4. A peening tool having a conical striking face substantially triangular in base outline, a groove in the base of the triangle, the surface of the striking face gradually and uniformly sloping from said groove to the sides so that when the peening tool comes in contact with a surface a lune shaped impression is formed which has its greatest depth and width at the center of the lune.

5. A peening tool having a conical striking face substantially triangular in base outline, a groove in the base of the triangle, the surface of the striking face gradually and uniformly sloping from said groove to the sides so that when the peening tool comes in contact with a surface a lune shaped impression is formed which has its greatest depth and width at the center of the lune, said impression gradually decreasing in depth from the center towards the sides of the lune.

In testimony whereof I have hereunto set my hand.

RICHARD A. BOOKER.